United States Patent [19]

Southgate

[11] 4,050,955

[45] * Sept. 27, 1977

[54] METHOD AND APPARATUS FOR LAUNCHING PIPELINE CLEARING SPHERES

[75] Inventor: Donald Alan Southgate, London, England

[73] Assignee: The British Petroleum Company Limited, London, England

[ * ] Notice: The portion of the term of this patent subsequent to Mar. 15, 1994, has been disclaimed.

[21] Appl. No.: 564,129

[22] Filed: Apr. 1, 1975

[30] Foreign Application Priority Data

Apr. 10, 1974 United Kingdom ............... 15912/74

[51] Int. Cl.² ................................................ B08B 9/04
[52] U.S. Cl. .................. 134/8; 15/104.06 A; 61/112; 134/24

[58] Field of Search ............................ 134/8, 22 C, 24; 15/104.06 A, 104.06 R, 3.5; 61/72.3, 112; 137/15; 138/93

[56] References Cited

U.S. PATENT DOCUMENTS

| | | | |
|---|---|---|---|
| 3,100,308 | 8/1963 | DeSena ......................... | 15/104.06 A |
| 3,751,932 | 8/1973 | Matthews, Jr. .................... | 61/72.3 X |
| 3,961,493 | 6/1976 | Nolan, Jr. et al. ....... | 15/104.06 A X |

*Primary Examiner*—Richard V. Fisher
*Attorney, Agent, or Firm*—Morgan, Finnegan, Pine, Foley & Lee

[57] ABSTRACT

Pipeline tool for closing an open end of a pipeline and which is suitable for use with a pipeline clearing sphere for clearing a pipeline has a tubular member for holding one or two spheres side by side and an aperture in the wall of the tubular member to release gas trapped therein and pipes for supplying compressed air to launch the spheres.

3 Claims, 1 Drawing Figure

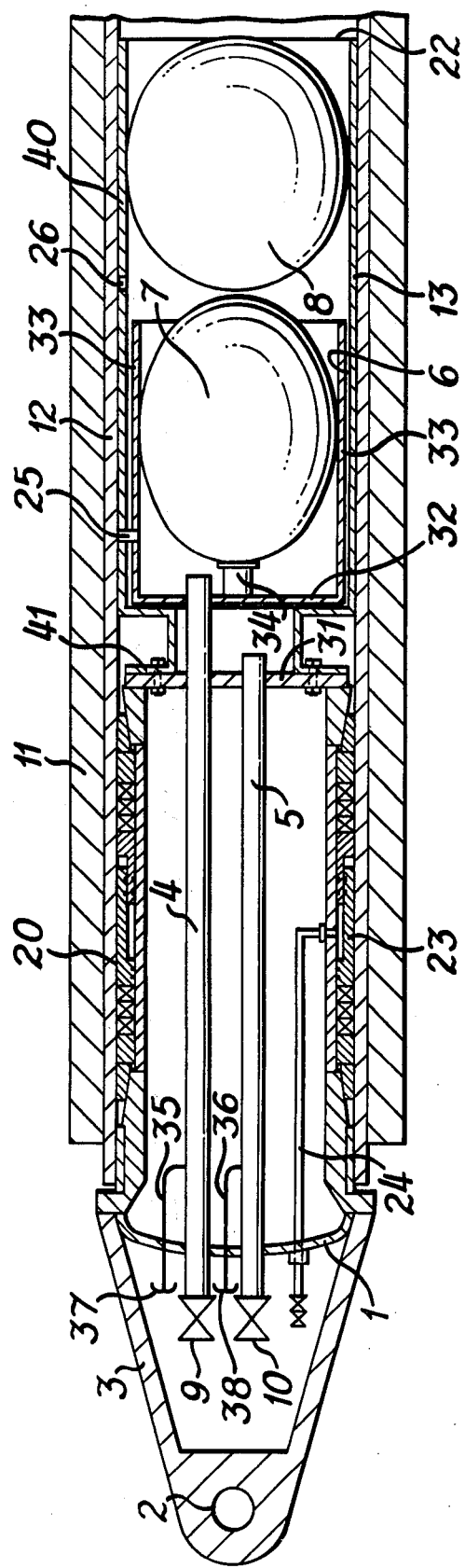

METHOD AND APPARATUS FOR LAUNCHING PIPELINE CLEARING SPHERES

This invention relates to a pipeline tool suitable for closing an open end of a pipeline and which is suitable for use with a pipeline clearing sphere for clearing a pipeline. The invention also relates to a method for closing an open end of a pipeline, particularly an underwater pipeline, and removing any air or water from the pipeline.

Sometimes it is necessary, for example to carry out repair work, to raise an underwater pipeline to the surface. If the pipeline has flooded, the presence of water in the pipeline makes it extremely heavy and, therefore, very difficult to raise. It is necessary, therefore, to remove the water from at least that part of the pipeline which is to be raised from the water bottom. A tool for closing an open end of a pipeline is described in our copending U.K. Patent Application No. 4885/72, now U.K. Pat. No. 1,421,134, which corresponds to U.S. patent application Ser. No. 326,299, filed Jan. 22, 1973 and now abandoned, comprising a tubular member having an open end and a transverse closure. The open end is adapted to be inserted in the open end of a pipeline and associated with the tubular member is an outwardly radially expansible gripping and sealing means for gripping the inside of the pipeline and sealing thereagainst. The tool can be used to get a pipeline clearing sphere into a pipeline and also move the sphere along inside the pipeline by a compressed gas and thereby clear the pipeline of any water or air. At the commencement of the pipeline clearing operation the pipeline sphere is sucked into the interior of the tubular member by evacuating the latter and the tool then inserted in the open end of the pipeline. To install the tool in a pipeline submerged underwater, it is necessary to lower the tool containing the sphere from the surface through the water which may be several hundred feet deep. It has been found that, when used in this manner the pipeline sphere sometimes fails to clear the pipeline satisfactorily. On inspection it has been found that the sphere has been distorted on account of the pressure of water (which at 420 feet is about 190 psi) which has forced the sphere into contact with the transverse closure of the tubular member of the pipeline tool.

An improved tool has now been invented in which the problem of the distortion of the pipeline sphere has, at least in part, been overcome.

According to the present invention a pipeline tool for closing an open end of a pipeline and which is suitable for use with a pipeline clearing sphere for clearing the pipeline, said tool comprising in combination:

i. a tubular member for holding a pipeline clearing sphere having an open end for inserting in the open end of a pipeline and a transverse closure.

ii. an outwardly radially expansible gripping and sealing means associated with the tubular member and actuatable by a fluid under pressure to grip the inside of a pipeline and seal thereagainst, iii. means for supplying said fluid and iv. means for introducing compressed gas to the interior of the tubular member to displace a pipeline clearing sphere from the interior of the tubular member into the interior of a pipeline, wherein the tubular member has an aperture in the wall thereof at a position so that gas can be released therethrough from the space defined by a sphere (when present) the transverse closure of the tubular member and the walls thereof.

Preferably the aperture is less than one diameter from the transverse closure, more preferably less than ¾ of a diameter. The diameter referred to being that of the tubular member.

Preferably means are provided for admitting water to the space between a sphere (when present) and the transverse closure of the tubular member.

Preferably the gripping and sealing means is arranged around the outside of the tubular member.

Preferably the interior of the tubular member is capable of holding two pipeline clearing spheres with their centres approximately on the longitudinal axis of the tubular member and means are provided for supplying compressed gas into the interior of the tubular member to displace the sphere individually and a further aperture is provided in the wall of the tubular member at a position so that gas can be released therethrough from the space defined by the two pipeline clearing spheres (when present) and the walls of the tubular member. Preferably the further aperture is from ¾ to 1½ diameters from the transverse closure. The apertures are preferably closeable e.g. by a plug, more preferably one having a screw thread. The individual displacement of spheres is the subject of my commonly assigned copending application Ser. No. 564,130, filed Apr. 1, 1975.

Preferably the tubular member has a further tubular member also having a transverse closure (hereafter referred to as the inner tubular member) of smaller diameter disposed within the first mentioned tubular member. The inner tubular member can be coaxial with the first and has a diameter from 0.7 to 0.98 that of the first, more preferably 0.9 to 0.96. In use this inner tubular member holds a sphere.

Preferably the means for supplying compressed air is a pipe leading to the interior of the inner tubular member and terminating at a small distance e.g. 6 to 24 ins from the transverse closure of the tubular member.

Preferably means are provided for preventing contact of the inner sphere with the end of the pipe, e.g. a rest member in the form of a projection having a flat end on the closure of the inner tubular member.

Preferably the rest member projects further from the transverse closure than the end of the pipe.

Preferably the tool has a transverse wall spaced apart from the first mentioned transverse closure and which permits communication between the space defined by the transverse wall and closure and the walls of the member and the space at the open end of the tubular member. The communication can be provided by a double wall along a portion of the tubular element.

Preferably a pipe for supplying compressed air leads to and ends in the space defined by the transverse wall and the side walls of the tubular member and the end wall of the inner tubular member.

According to another aspect of the invention a method of clearing a pipeline using a pipeline tool as hereinbefore described comprises:

i. sucking a pipeline clearing sphere into the tubular member by evacuating the member ii. admitting water to, and releasing air from, the space between the sphere and the transverse closure iii. inserting the open end of the tool in the open end of a submerged pipeline iv. actuating the gripping and sealing means to expand outwardly and radially to grip the inside of the pipeline and seal thereagainst, and v. supplying compressed gas to the space between the sphere and the transverse closure to displace the sphere into the pipeline and along the inside thereof to thereby clear the pipeline.

The invention is illustrated by reference to the accompanying drawing in which is shown the pipeline tool in longitudinal section.

The tool indicated generally by 20 has a tubular member 13 having a transverse closure in the form of a transverse wall 31 and an open end 22 which is to be inserted in the open end of a pipeline 12. The tubular member 13 has an outwardly radially expansible gripping and sealing means (which is releasable) indicated generally by 23 and a pipe 24 for the admission of hydraulic fluid to actuate the gripping and sealing means 23. The gripping and sealing means 23 is carried by a housing 20 the end wall 31 of which is bolted to a flange 41 the tubular member 13. The tubular member 13 has an inner tubular member of smaller diameter disposed therein and also has closeable apertures 25 and 26, whereby air or gas trapped in the member can be released.

The tool is shown holding two pipeline spheres 7 and 8 which are normally the same size and have a diameter slightly greater than that of the pipeline 12 so that they are of an interference fit therein but moveable therealong.

Pipes 4 and 5 are provided with valves 9 and 10 respectively, and with lines 35 and 36 which latter lines have caps 37 and 38 for sealing after use. Pipe 5 terminates in the space between transverse walls 31 and 32 and pipe 4 extends further and ends in the space defined by the wall 32 and the side walls of the inner tubular member 33. The pipe 4 extends about 3 inches beyond wall 32. To prevent contact between a sphere and the end of the pipe 4 a rest member 34 is provided on wall 32. The rest member projects about 4 inches out from the wall 32.

At the end remote from the open end 22 there is provided a support plate 1 for pipes 4, 5, 35, 36 and 24 and also a conically tapering member 3 which protects valves 9 and 10 from damage during operations and has at its apex an anchoring point 2 which is on the longitudinal axis of the tubular member for the attachment of a chain or cable (not shown).

The inner tubular member 33 is positioned concentrically within portion 40 on longitudinal stringers (not shown).

When the tool is used to clear an underwater pipeline, prior to lowering into the water, spheres 7 and 8 are sucked into the tubular member 13 by evacuating the member by means of pipes 35 and 36 with valves 9 and 10 closed. Water is then pumped into the member via pipes 35, 36, 4 and 5 and air vented through closeable apertures 25 and 26. Caps 37 and 38 are then screwed on to seal pipes 35 and 36 and plugs screwed into apertures 25 and 26. Then the tubular member 13 containing the spheres 7 and 8 is lowered through the water and inserted in the open end of the submerged pipeline 12 which has a concrete weight coating 11 and the gripping and sealing means 23 actuated by pumping in fluid via line 24 to grip the inside of the pipeline 12 and seal thereagainst. Valve 10 is then opened and compressed air admitted via pipe 5 through the annular space 6 between the tubular member 13 and the inner tubular member 33 to displace sphere 8 from the interior of the tubular member 13 into the interior of the pipeline and move along inside the pipeline. When it is desired to displace sphere 7 valve 9 is opened and compressed air is admitted from pipe 4.

I claim:
1. An underwater pipeline apparatus for closing an open end of a pipeline and for carrying and launching at least one pipeline clearing sphere for clearing the pipeline, said apparatus comprising in combination:
   i. a tubular member having a given diameter for holding a pipeline clearing sphere and having an open end for inserting in the open end of a pipeline and a transverse closure opposite said open end, said closure being spaced from the open end a distance sufficient to permit the clearing sphere to be positioned therebetween;
   ii. an outwardly radially expanisble gripping and sealing means associated with the tubular member and actuatable by a fluid under pressure to grip the inside of a pipeline and seal thereagainst;
   iii. means for supplying said fluid to actuate said gripping and sealing means; and
   iv. means for introducing compressed gas to the interior of the tubular member to displace the pipeline clearing sphere from the interior of the tubular member into the interior of the pipeline wherein the tubular member has an aperture in the wall thereof at a position so that gas can be released therethrough from the space between the location in the tubular member to be occupied by a spere and the transverse closure of the tubular member and the walls thereof, and means for admitting water to the interior of the space, whereby the water in said space acts to overcome sphere distortion when the apparatus is submerged.

2. A pipeline apparatus as claimed in claim 1 wherein the interior of the tubular member is capable of holding two pipeline clearing spheres with their centers approximately on the longitudinal axis of the tubular member and wherein means are provided for supplying compressed gas to the interior of the tubular member to displace the spheres individually and wherein a further aperture is provided in the wall of the tubular member at a position so that gas can be released therethrough from a second space between the locations to be occupied by the two pipeline clearing spheres and the walls of the tubular member and further means for admitting water to said second space, whereby said water acts to overcome distortion of said further sphere when the apparatus is submerged.

3. A method of clearing a pipeline using a pipeline clearing apparatus which method comprises:
   i. sucking a pipeline clearing sphere into a tubular member having a closed and open end by partly evacuating the member, said sphere and closed end defining a space therebetween;
   ii. admitting water to, and releasing air from, the space between the sphere and the closed end of the tubular member whereby the admitted water in said space acts to overcome sphere distortion when the apparatus is submerged;
   iii. inserting the open end of the tubular member in the open end of a submerged pipeline;
   iv. sealingly engaging the open end of the tubular member to the pipeline; and
   v. supplying compressed gas to the space between the sphere and the closed end to displace the sphere into the pipeline and along the inside thereof to thereby clear the pipeline.

* * * * *